HIGH LEVEL, COLOR DEMODULATION SYSTEM

Filed Oct. 19. 1955 4 Sheets-Sheet 1

INVENTOR.
ALBERT MACOVSKI
BY
[signature]
ATTORNEY

INVENTOR.
ALBERT MACOVSKI
BY
ATTORNEY

Nov. 24, 1959 A. MACOVSKI 2,914,604

HIGH LEVEL, COLOR DEMODULATION SYSTEM

Filed Oct. 19, 1955 4 Sheets-Sheet 3

INVENTOR.
ALBERT MACOVSKI
BY
[signature]
ATTORNEY

INVENTOR.
ALBERT MACOVSKI
BY [signature]
ATTORNEY

United States Patent Office 2,914,604

Patented Nov. 24, 1959

2,914,604

HIGH LEVEL, COLOR DEMODULATION SYSTEM

Albert Macovski, Massapequa, N.Y., assignor to Radio Corporation of America, a corporation of Delaware Application October 19, 1955, Serial No. 541,350

7 Claims. (Cl. 178—5.4)

The present invention relates to circuits for producing component color signals in a color television receiver and more particularly to high level color demodulators for producing a trio of component color signals from a chrominance signal and a luminance signal.

The composite color television signal, which was approved by the Federal Communications Commission on December 17, 1953, includes a luminance signal, a chrominance signal, picture synchronizing signals and color synchronizing bursts. The luminance signal contains information representative of the brightness of the televised image. The luminance signal is a wide band signal having components up to 4.2 mcs.

The chrominance signal includes modulations representative of color difference signals of various color content; these color difference signals having a medium bandwidth. One type of color difference signal may be expressed in the form of $C-Y$ where C is a component color information signal and Y is the luminance signal; addition of this type of color difference signal with the luminance signal will yield the component color signal. Another type of color difference signal is of the form $C_1-C_2$ where $C_1$ and $C_2$ are component color information signals.

Color difference information signals may be demodulated from the chrominance signal by use of a synchronous demodulator, that is, by heterodyning the chrominance signal with a reference signal having a phase corresponding to the phase of the desired color difference signal in the chrominance signal. The color synchronizing bursts included with the composite color television signal provide reference phase information so that reference signals of accurately maintained phase can be produced in a color television receiver. The luminance signal and selected color difference signals are thereupon applied to the color image reproducer to cause the reproducer to reproduce the televised image.

It is an object of the present invention to provide an improved circuit for applying color information to a color reproducer.

It is a further object of this invention to provide an improved two-demodulator circuit for producing a trio of component color signals and wherein there is no interaction between the two demodulators.

According to one form of the invention a pair of medium bandwidth color difference signals of the type $C_1-C_3$ and $C_2-C_3$ are demodulated from a chrominance signal. $C_1$, $C_2$ and $C_3$ relate to the three component color information signals which are to be used to drive the color image reproducer. $C_1$, $C_2$ and $C_3$ may refer typically to red, blue and green color information signals. Means are provided to combine this pair of color difference signals and a wideband luminance signal to yield a full bandwidth $C_3$ signal. Each of the pair of color difference signals is thereupon combined with the $C_3$ signal to form the $C_1$ and $C_2$ signals at full bandwidth.

Other and incidental objects of this invention will become apparent upon a reading of the specification and a study of the figures where:

Figure 1:
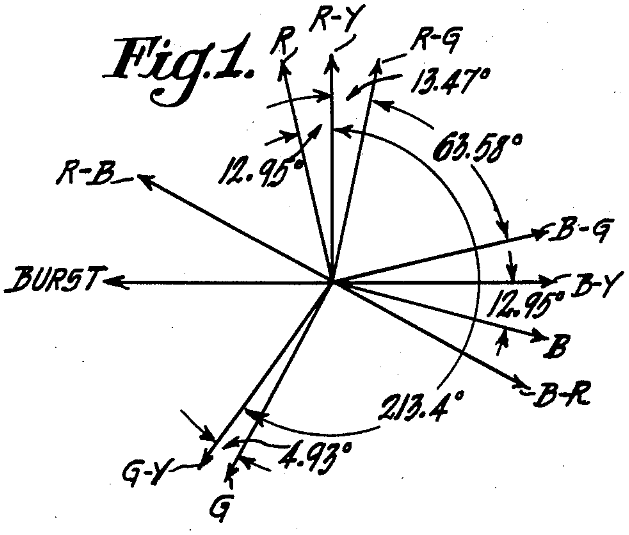
Figure 1 is a vector diagram relating the phases of various color difference signals in the chrominance signal relative to the phase of the burst.

The chrominance signal is a modulated subcarrier which contains modulations representative of a wide gamut of color difference signals. Each color difference signal is associated with a particular phase of the chrominance signal. Figure 1 is a vector diagram relating the phases of pertinent color difference signals relative to the reference phase of the color synchronizing bursts. The three component color information signals required of one form of color television receiver are red, green and blue color information signals, namely, R, G and B. $R-Y$, $B-Y$ and $G-Y$ color difference signals are those signals which when combined with a luminance signal yield R, G and B signals. It is seen from the vector diagram of Figure 1 that the phase of the $R-Y$ color difference signal lags the burst phase by 90° with the phases of the $B-Y$ and $G-Y$ color difference signals lagging the phase of the $R-Y$ color difference signal by 90° and 213.4°, respectively. Included in the chrominance signal are R, B and G color difference signals which when considered in combination with the luminance signal directly describe the red, green and blue information. The phase of the R color difference signal leads the phase of the $R-Y$ color difference signal by 13.47° with the phase of the B color difference signal lagging the phase of the $B-Y$ color difference signal by 12.95°. The phase of the $G-Y$ color difference signal leads the phase of the G color difference signal by 4.93°.

The chrominance signal also includes color difference signals of the form $R-G$, $B-G$ and $R-B$, whose vectors are shown in Fig. 1. An $R-G$ color difference signal is in quadrature with the B color difference signal; the $R-G$ color difference signal contains no blue information, only positive polarity red information and negative polarity green information, hence the designation $R-G$. In like fashion, the $B-G$ color difference signal is 90° removed from the phase of the R color difference signal, and is seen to therefore contain no red information. The $R-G$ color difference signal lags in phase the $R-Y$ color difference signal by 12.95° with the $B-G$ color difference signal lagging the $R-G$ color difference signal by 63.58°.

Any plurality of color difference signals can be added together to provide another color difference signal. This follows from inspection of the vectors illustrated in Figure 1. The present inventor has, for example, formed a $G-Y$ color difference signal by combining $R-G$ and $B-G$ color signal information according to the following equation:

$$-G-Y=.3\times(R-G+.11\times(B-G) \qquad (1)$$

The color difference signals in the chrominance signal in general are limited in bandwidth to approximately upper frequencies of ½ mc. except for orange-cyan information existing along a so-called I axis which is a vector leading the $R-Y$ phase by 33°. Orange-cyan information contains signal components up to 1½ mcs.

Figure 2:
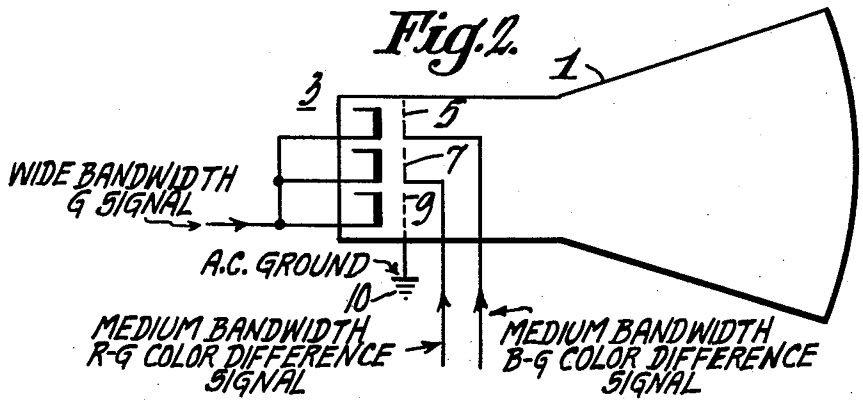
Figures 2 and 3 are block diagrams of forms of the present invention.

One form of the present invention is shown in Figure 2,

A wide band green "G" component color signal of negative polarity is applied to the cathodes 3 of the kinescope 1. This signal is made up of the combination of a wideband luminance signal containing monochrome information relating to the televised color image, and information relating to a medium band $G-Y$ color difference signal. The bandwith of the $G-Y$ color difference signal may be in the range from 0 to ½ mc. or in the range from 0 to 1½ mcs. depending upon the type of demodulation employed. If the control electrode 9 is A.C. grounded, the electron beam issuing from the cathode associated with the control electrode 9 will contain modulations representative of wide band green component color signal information. Medium band $R-G$ and $B-G$ color difference signals are applied to the control electrodes 7 and 5, respectively. Signal addition of the wide band green component color signal and the medium band $R-G$ color difference signal will result in modulations in the electron beam, issuing from the cathode associated with control electrode 7, wherein is conveyed wide band red component color information. In like fashion, the electron beam issuing from the cathode associated with control electrode 5 combines wide band green component color information with medium bandwidth $B-G$ color difference signal information to develop wide band blue component color information. It is to be appreciated that the specific colors utilized in connection with the various electrodes of the circuit of Figure 2 are for illustrative purposes and that any desired combination of colors may be used.

Figure 3:
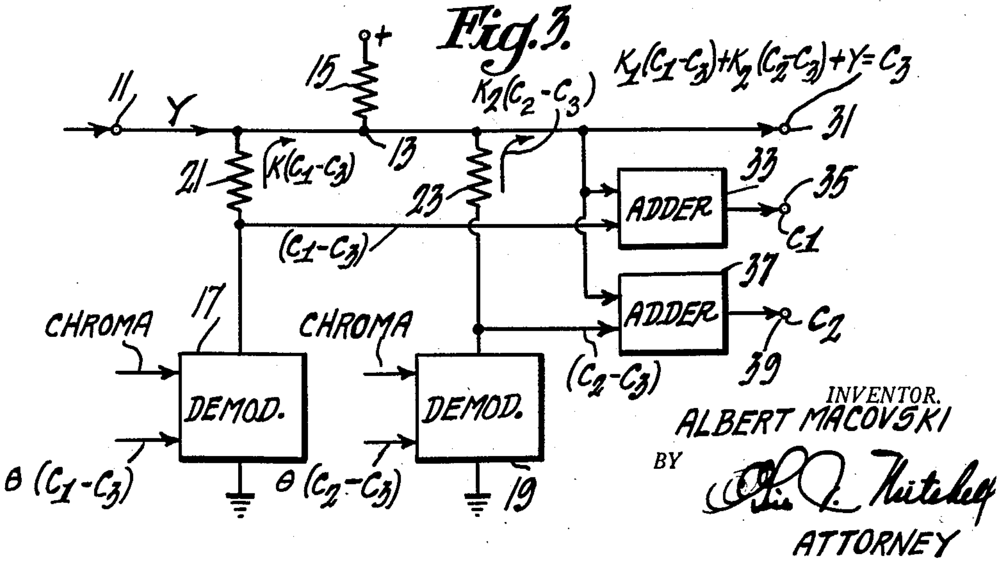

The block diagram of Figure 3 is one form of the present invention. A Y or luminance signal is applied by way of terminal 11 to terminal 13 and is caused to develop corresponding variations in the voltage produced across the resistance 15. A pair of demodulators 17 and 19 are coupled by way of resistors 21 and 23 to terminal 13; signals developed by demodulators 17 and 19 are caused to add across resistor 15 and be combined with the Y signal at terminal 13. Y signal information will not be applied to adders 33 and 37 by way of resistors 21 and 23 respectively since the impedance of this path will be much larger than the impedance of the path which directly couples the terminal 13 to the adders 33 and 37.

The chrominance signal is applied to both demodulators 17 and 19. A demodulating signal having a phase corresponding to a $C_1-C_3$ color difference signal in the chrominance signal is applied to the demodulator 17. A demodulating signal having a phase corresponding to a $C_2-C_3$ color difference signal in the chrominance signal is applied to demodulator 19.

$k_1(C_1-C_3)$ and $k_2(C_1-C_3)$ color difference signals are produced, respectively, across the resistors 21 and 23. $k_1$ and $k_2$ are proportionality factors. By combining the Y signal with the $k_1(C_1-C_3)$ and $k_2(C_2-C_3)$ across the resistance 15, a $C_3$ component color signal will be produced at the output terminal 31. The medium bandwidth $C_1-C_3$ color difference signal from demodulator 17 is added to the wide bandwidth $C_3$ signal in the adder 33 to produce a wide bandwidth $C_1$ signal at the output terminal 35. In like fashion, the medium bandwidth $C_2-C_3$ color difference signal from the demodulator 19 is added to a wide bandwidth $C_3$ signal in the adder 37 to produce a wide band $C_2$ signal at the output terminal 39.

If the $C_1$, $C_2$ and $C_3$ color difference signals of the chrominance signal correspond to the R, B and G signals of the chrominance signal, it follows from Equation 1 that the resulting signal $C_3$, produced after combination of the aforementioned signals with the Y or luminance signal which has a wide bandwidth, will be a wide bandwidth G or green signal. The wide bandwidth green signal will contain wide bandwidth Y information and medium bandwidth $G-Y$ information. The $C_1$ and $C_2$ signals produced at the output terminals 35 and 39 will be wide band red and blue component color signals. In the specification to follow, $C_1$, $C_2$ and $C_3$ will, for purpose of illustration, be assumed to correspond to red, blue, and green, respectively.

Figure 4:
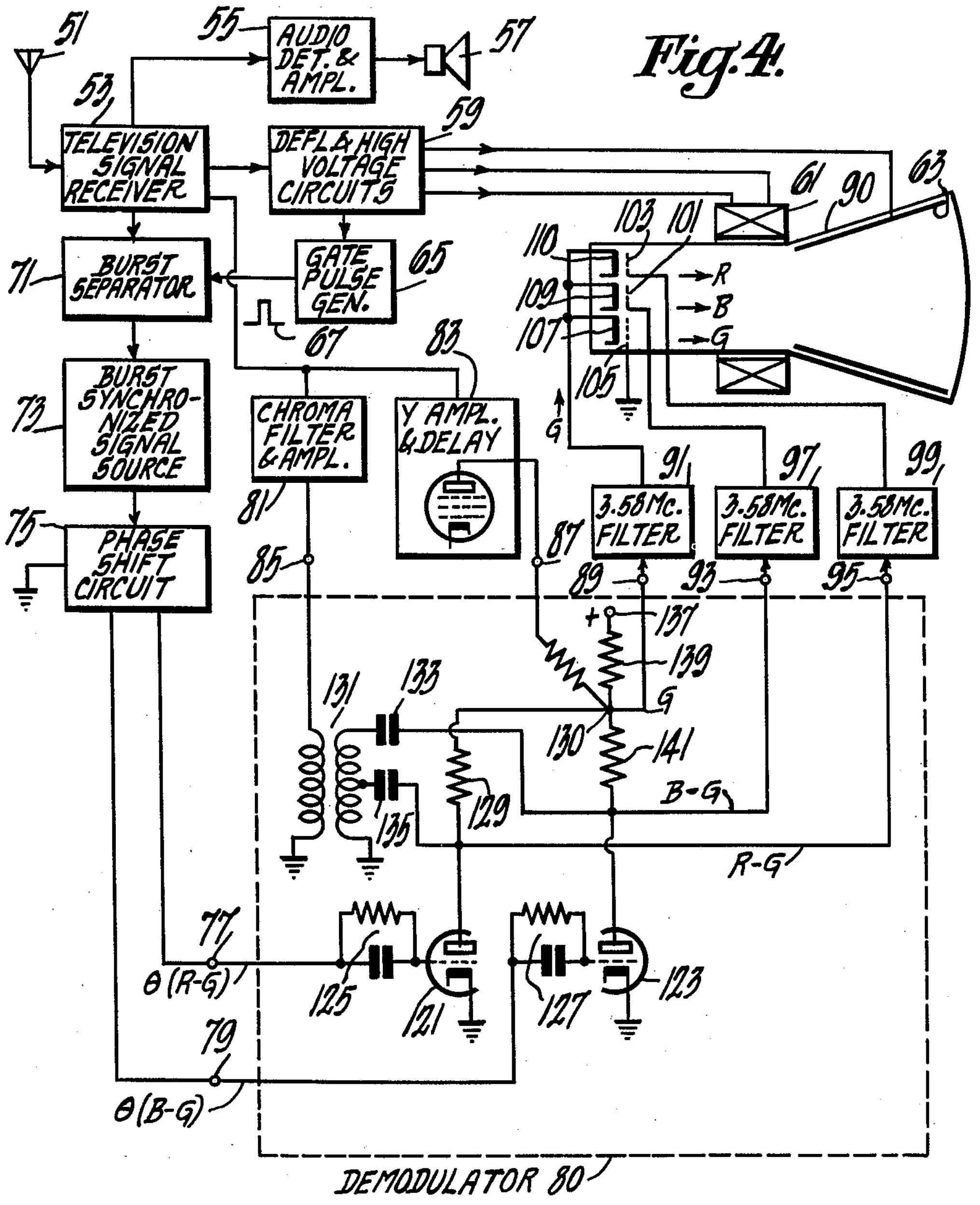
Figure 4 is a block diagram of a color television receiver which includes a schematic diagram of one form of the present invention.

The block diagram of the color television receiver of Figure 4 includes a schematic diagram of one form of the present invention. The incoming signal from the transmitter arrives at the antenna 51 and is applied to the television signal receiver 53. In the television signal receiver 53 are circuits for first detection, intermediate frequency amplification and second detection. The received signal is demodulated to produce a composite color television signal. The color television signal includes a frequency modulated sound carrier which is transmitted 4½ mcs. removed from the picture carrier. Utilizing, for example, an intercarrier sound circuit, the sound information is demodulated from the frequency modulated carrier of the color television signal and amplified in the audio detector and amplifier 55. The amplified sound signal is thereupon applied to the loud speaker 57.

The color television signal is applied to the deflection and high voltage circuits 59; the deflection and high voltage circuits 59 separate the deflection synchronizing signals from the color television signal and apply deflection signals to the yokes 61 and a high voltage to the ultor 63. The deflection and high voltage circuits 59 also energize the gate pulse generator 65 to produce the gate pulse 67. The gate pulse 67 has a duration interval at least that of the color synchronizing bursts which are transmitted on the "back porch" of the horizontal synchronizing pulses.

The color television signal and the gate pulse 67 are applied to the burst separator 71 which, utilizing a gate type of circuit, separates the color synchronizing bursts from the color television signal and applies the separated bursts to the burst synchronized signal source 73.

The burst synchronized signal source 73 produces a reference signal which is continuous at least for a scanning period and which has a phase accurately synchronized with a phase prescribed by the color synchronizing bursts. The burst synchronized signal source 73 may be a ringing circuit, injection locked oscillator or reactance tube-phase discriminator controlled oscillator. The burst synchronized signal source 73 thereupon applies the aforementioned reference signal to the phase shift circuit 75 which applies a pair of suitably phased demodulating signals to the input terminals 77 and 79 of the demodulator 80.

A color television signal from the television signal receiver 53 is applied to the chroma filter and amplifier 81 and to the Y amplifier and delay line 83. The chroma filter and amplifier 81 selects a band of frequencies corresponding to chrominance signal information from the color television signal and applies the resulting signal, hereinafter referred to as the chroma signal, to the input terminal 85 of the demodulator 80.

An amplified and properly delayed Y signal, constituting a wide band luminance signal, is applied to the input terminal 87 of the demodulator 80. The demodulator 80, responsive to the demodulating signals applied to the terminals 77 and 79, produces a trio of color information signals. One of the trio, a wide band green information signal, is produced at the terminal 89; this green color information signal is passed through the 3.58 mc. filter 91 which removes components in the vicinity of the chrominance signal subcarrier. The resulting wideband green information signal is thereupon applied simultaneously to all three cathodes of the color kinescope 90.

The demodulator 80 also provides medium bandwidth $B-G$ and $R-G$ color difference signals at the output terminals 93 and 95. These medium bandwidth signals have a bandwidth of from approximately 0 to ½ mc. The $B-G$ and $R-G$ color difference signals are filtered by the 3.58 mc. filters 97 and 99 and applied respectively to the control grids 101 and 103 of the color kinescope 90. The control grid 105 of the color kinescope is A.-C. grounded.

The electron beam issuing from the cathode 107 of the color kinescope 90 will pass through the grounded grid 105 and convey wideband green color information to the color target of the color kinescope 90; the electron beam issuing from the cathode 109 and containing wide band green information will be combined with medium band *B—G* color difference signal information to produce a blue component color signal whose modulations in the electron beam will be applied to the target area.

The electron beam issuing from the cathode 110, and containing wide band green information, will pass through control grid 103 whereupon it will be combined with medium band width *R—G* color difference signal information to produce a wide band red or R component color signal; the modulations in this electron beam corresponding to the red component color signal will be applied to the target area of the color kinescope 90.

The demodulator 80 functions in the following fashion. A pair of demodulator tubes 121 and 123 are used. The cathodes of these tubes are connected to ground. An *R—G* phased demodulating signal is applied to the control grid of the demodulator tube 121 by way of the biasing circuit 125. A *B—G* phased demodulating signal is applied to the control grid of demodulator tube 123 by way of the biasing circuit 127. The biasing circuits 125 and 127 produce grid limiting action developing negative biases on the control grids of demodulator tubes 121 and 123 whereby these tubes conduct class C.

The chroma is applied from terminal 85 to the transformer 131. Suitable amplitudes of the chroma are applied by way of condensers 133 and 135 to the anodes of demodulator tubes 123 and 121 respectively. The amplitudes of chroma applied to the demodulator tubes 121 and 123 are typically in the ratio of 1 to 1.4.

The anode of demodulator tube 121 is coupled through an anode resistor 129 to the terminal 130 which is in turn coupled to the B+ terminal 137 by way of the load resistance 139. The anode of the demodulator tube 123 is coupled to terminal 130 by way of the anode resistance 141. The anode of the final amplifier tube 143 of the Y amplifier and delay 83 is also coupled to terminal 130 by way of terminal 87.

Demodulator tubes 121 and 123 develop *R—G* and *B—G* color difference signals across the anode resistors 129 and 141 respectively. In addition, currents representing wide band Y signal information from the amplifier tube 143, an *R—G* color difference signal from demodulator tube 121 and a *B—G* color difference signal from the demodulator tube 123 are caused to pass through the load resistor 139 in a manner whereby these three signals are added together in proper amplitudes to provide a wide band green or G signal. The wide band green or G signal is thereupon developed at the output terminal 89 from which terminal it is passed through 3.58 mc. filter 91 and applied simultaneously to the cathodes 107, 109 and 110 of the color kinescope 90.

The demodulator tube 121 develops a medium bandwidth *R—G* color difference signal at the output terminal 95. The demodulator tube 123 develops a medium bandwidth *B—G* color difference signal at the output terminal 93. The *B—G* and *R—G* color difference signals when applied to the control grids 101 and 103 respectively, thereupon combine with the wide band green or G signal to produce electron beam modulations representative of red "R" and blue "B" component color signals as previously mentioned.

Figure 5:
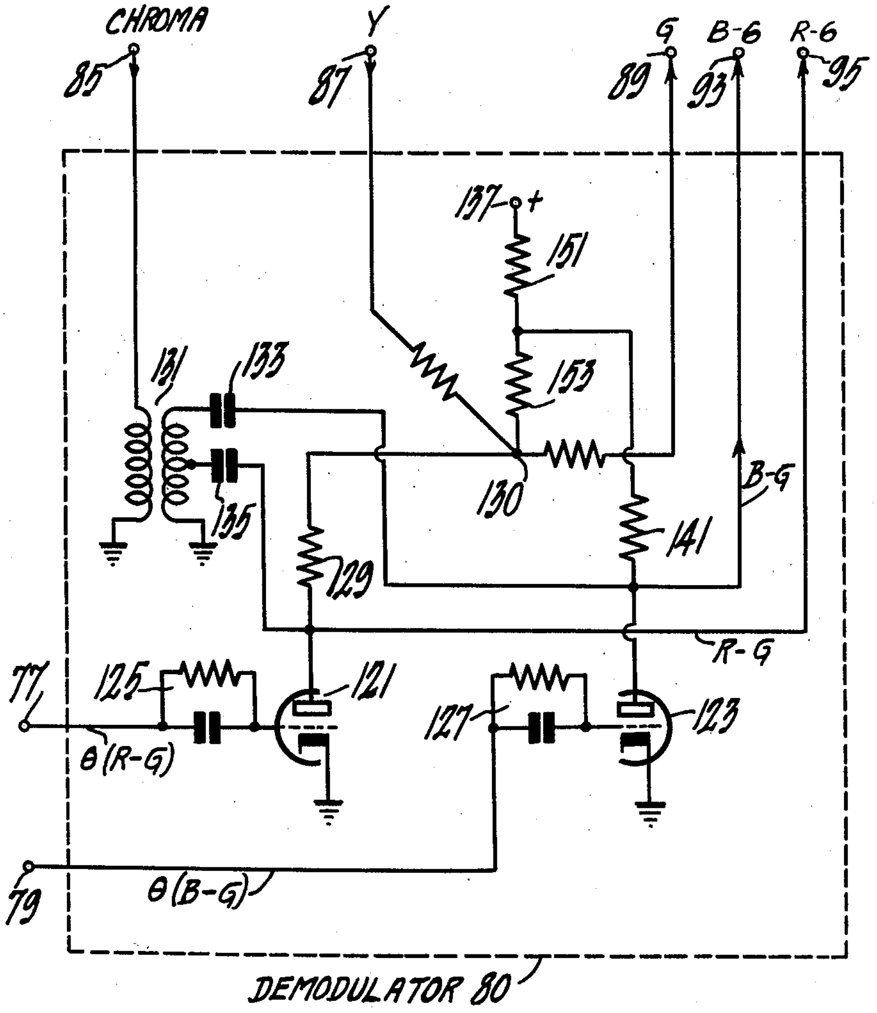
Figures 5 and 6 are schematic diagrams of other forms of the demodulator circuit of the present invention.

The circuit of Figure 5 is a schematic diagram of the demodulator 80 wherein another means is provided for obtaining *B—G* and *R—G* color difference signals in the proper proportions so that they can be added to the Y luminance signal at the terminal 130 to properly form a wide band green "G" component color signal. As is seen in the circuit of Figure 5, the load resistor coupled between the terminal 130 and the B+ terminal 137 is made up of two resistors 151 and 153 which are connected serially. The anode load 141 is thereupon connected to the mid-connection of resistors 151 and 153 in a manner which facilitates the proper proportioning of the amplitudes of the signals developed at the terminal 130.

The demodulator 80 of Figure 5 performs a useful function as compared to the performance of the demodulator 80 of Figure 4. In the demodulator 80 of Figure 5, the ratio of the magnitudes of the load resistance 139 to the magnitudes of the demodulated load resistances 129 and 141 will produce the desired wide band green component color signal at the kinescope cathodes 107, 109 and 110.

The demodulator 80 of Figure 6 accomplishes a very useful objective, described as follows: in some color television circuits, it is found that some color difference signal information at the cathodes of the kinescope will be greater than necessary since the kinescope electron guns will act as cathode followers coupling a portion of the color difference signals applied to the control grids of the kinescope into an output load resistance for the luminance signal. This coupling may provide an increase of 10% of the *B—G* color difference signal and about 20% of the *R—G* color difference signal into this output load resistance. Thus, only an additional 10% of the *R—G* color difference signal is needed by direct coupling to add to the luminance signal to form a green signal. The demodulator 80 of Figure 6 is a demodulator arrangement which takes this kinescope current coupling into account.

Figure 6:
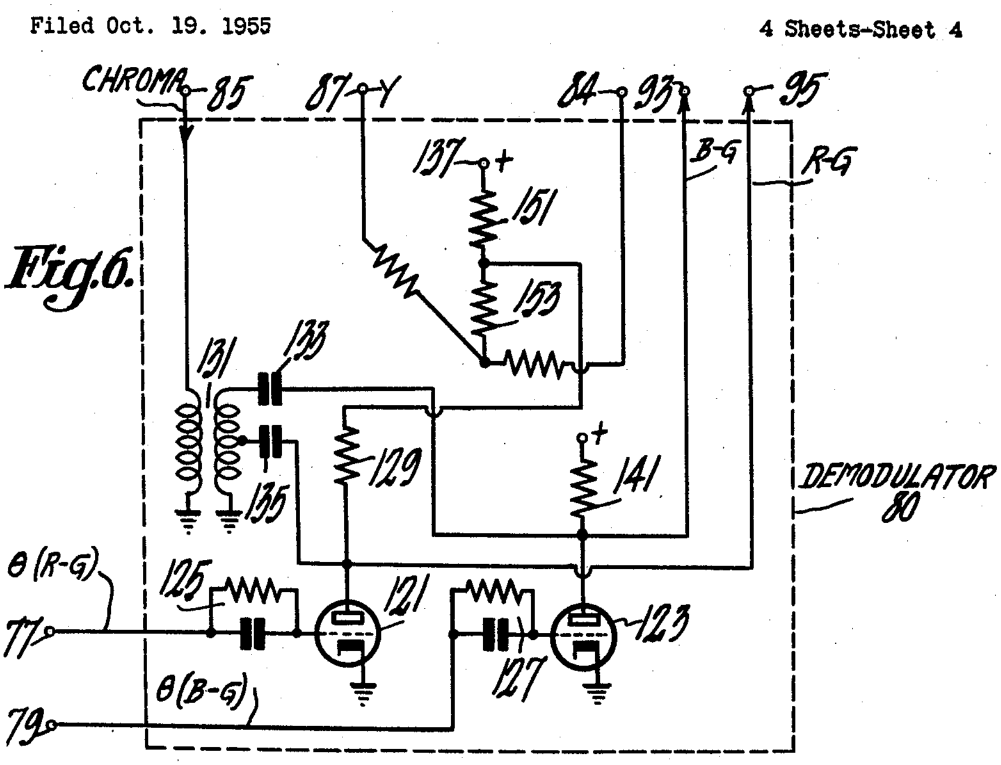

The connections of the demodulator 80 of Figure 6 are such that the connection of the anode of demodulator tube 121 to the mid-connection of the resistors 151 and 153 supplies the required *R—G* signal to the resistors 151 and 153 so that when the demodulator 80 of Figure 4 is replaced by the demodulator 80 of Figure 6, the *R—G* and *B—G* color difference signals, cathode-current coupled from the control electrodes 101 and 103 into these resistors, will produce a wide band green signal at the cathodes 110, 109 and 107.

Figure 7:
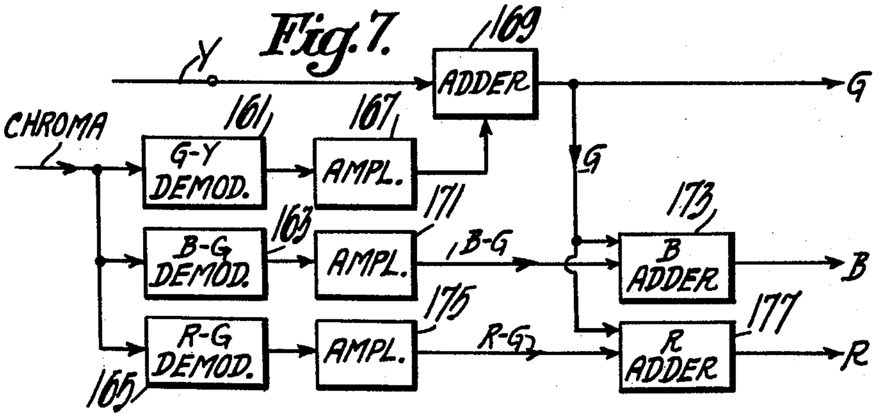
Figures 7 and 8 are block diagrams of other forms of the invention for producing a trio of component color signals from luminance and chrominance signals.
Figure 8:
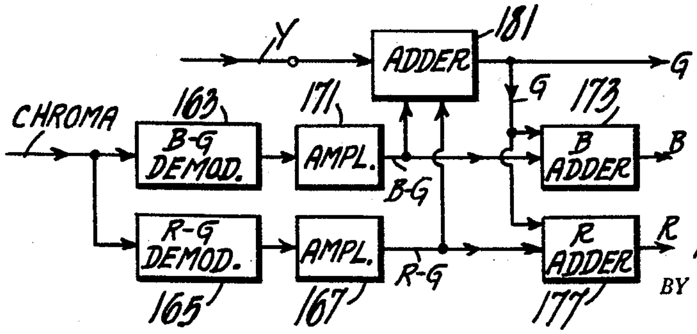

The block diagrams in Figures 7 and 8 illustrate two other arrangements which can be used to provide a trio of component color signals from a luminance signal and a chrominance signal according to the present invention.

In Figure 7, the chrominance signal is applied to the *G—Y* demodulator 161, the *B—G* demodulator 163 and the *R—G* demodulator 165. The *G—Y* color difference signal from the *G—Y* demodulator 161 is amplified in the amplifier 167 and applied to the adder 169 where it is combined with the luminance Y signal to form a G signal. The *B—G* color difference signal from the *B—G* demodulator 163 is amplified in the amplifier 171 and applied to the B adder 173 where it is combined with the G signal to form the B signal. The *R—G* color difference signal from the *R—G* demodulator 165 is amplified in the amplifier 175 and combined with the G signal in the R adder 177 to form an R signal.

In Figure 8 the G signal is formed by combining the luminance Y signal and the *R—G* and *B—G* color difference signals in the adder 181.

Having described the invention, what is claimed is:

1. In a color television receiver or the like, the combination of, a luminance signal amplifier, a source of a luminance signal coupled to said amplifier, said luminance signal having components in low and high frequency ranges, first and second color demodulators, a source of a chrominance signal coupled to both of said demodulators, said chrominance signal containing color difference modulations which when combined with the low frequency portion of the luminance signal provide red, R, blue, B, and green, G, component color signals in the low frequency range, a source of demodulating oscillations at the $R-G$ phase of the chrominance signal coupled to said first demodulator, a source of demodulating oscillations at the $B-G$ phase of the chrominance signal coupled to said second demodulator, means to combine the luminance signal from said luminance amplifier with predetermined proportions of the demodulated $R-G$ and $B-G$ signals from said demodulators to produce a combined high frequency luminance and low frequency green component color signal, a color kinescope having red, blue and green guns each including cathode and grid electrodes, means coupling said combined signal to the cathodes of all of said guns, means coupling the grid of said green gun to a point of reference potential, means coupling the $R-G$ signal from said first demodulator to the grid of the red gun, and means coupling the $B-G$ signal from said second demodulator to the grid of the blue gun.

2. In a color television receiver or the like, the combination of, a luminance signal amplifier, a source of a luminance signal coupled to said amplifier, said luminance signal having components in low and high frequency ranges, first and second color demodulators, a source of a chrominance signal coupled to both of said demodulators, said chrominance signal containing color difference modulations which when combined with the low frequency portion of the luminance signal provide $C_1$, $C_2$ and $C_3$ component color signals in the low frequency range, a source of demodulating oscillations at the $C_1-C_3$ phase of the chrominance signal coupled to said first demodulator, a source of demodulating oscillations at the $C_2-C_3$ phase of the chrominance signal coupled to said second demodulator, means to combine the luminance signal from said luminance amplifier with predetermined proportions of the demodulated $C_1-C_3$ and $C_2-C_3$ signals from said demodulators to produce a combined high frequency luminance and low frequency $C_3$ component color signal, a color kinescope having $C_1$, $C_2$ and $C_3$ guns each including cathode and grid electrodes, means coupling said combined signal to the cathodes of all of said guns, means coupling the grid of said $C_3$ gun to a point of reference potential, means coupling the $C_1-C_3$ signal from said first demodulator to the grid of the $C_1$ gun, and means coupling the $C_2-C_3$ signal from said second demodulator to the grid of the $C_2$ gun.

3. In a color television receiver or the like, the combination of, a luminance signal amplifier, a source of of a luminance signal coupled to said amplifier, said luminance signal having components in low and high frequency ranges, first and second color demodulators, a source of a chrominance signal coupled to both of said demodulators, said chrominance signal containing color difference modulations which when combined with the low frequency portion of the luminance signal provide red, R, blue, B, and green, G, component color signals in the low frequency range, a source of demodulating oscillations at the $R-G$ phase of the chrominance signal coupled to said first demodulator, a source of demodulating oscillations at the $B-G$ phase of the chrominance signal coupled to said second demodulator, means to combine the luminance signal from said luminance amplifier with predetermined proportions of the demodulated $R-G$ and $B-G$ signals from said demodulators to produce a combined high frequency luminance and low frequency green component color signal, a color kinescope having red, blue and green guns, means coupling said combined signal to all of said guns, means coupling the $R-G$ signal from said first demodulator to the red gun, and means coupling the $B-G$ signal from said second demodulator to the blue gun.

4. In a color television receiver or the like, the combination of, a luminance signal amplifier, a source of a luminance signal coupled to said amplifier, said luminance signal having components in low and high frequency ranges, first and second color demodulators, a source of a chrominance signal coupled to both of said demodulators, said chrominance signal containing color difference modulations which when combined with the low frequency portion of the luminance signal provide red, R, blue, B, and green, G, component color signals in the low frequency range, a source of demodulating oscillations at the $R-G$ phase of the chrominance signal coupled to said first demodulator, a source of demodulating oscillations at the $B-G$ phase of the chrominance signal coupled to said second demodulator, means to combine the luminance signal from said luminance amplifier with predetermined proportions of the demodulated $R-G$ and $B-G$ signals from said demodulators to produce a combined high frequency luminance and low frequency green component color signal, means to add said combined signal and said $R-G$ signal from said first demodulator to provide a red component color signal, and means to add said combined signal and said $B-G$ signal from said second demodulator to provide a blue component color signal.

5. In a color television receiver or the like, the combination of, a source of a luminance signal having components in low and high frequency ranges, a source of a chrominance signal having color difference modulations which when combined with the low frequency portion of the luminance signal provide component color signals $C_1$, $C_2$ and $C_3$ in the low frequency range, means to demodulate said chrominance signal to provide $C_1-C_3$ and $C_2-C_3$ color difference signals, means to combine predetermined proportions of said luminance signal and said $C_1-C_3$ and $C_2-C_3$ signals to provide a combined high frequency luminance and low frequency $C_3$ component color signal, means to add said combined signal and said $C_1-C_3$ signal to provide a $C_1$ component color signal, and means to add said combined signal and said $C_2-C_3$ signal to provide a $C_2$ component color signal.

6. In a color television receiver or the like, the combination of, a source of a luminance signal Y having components in low and high frequency ranges, a source of a chrominance signal having color difference modulations which when combined with the low frequency portion of the luminance signal provide component color signals R, B and G in the low frequency range, means to demodulate said chrominance signal to provide $G-Y$, $R-G$ and $B-G$ color difference signals, means to add said luminance signal and said $G-Y$ signal to provide a combined high frequency luminance and low frequency G component color signal, means to add said combined signal and said $R-G$ signal to provide an R component color signal, and means to add said combined signal and said $B-G$ signal to provide a B component color signal.

7. In a color television receiver or the like, the combination of, a source of a luminance signal Y having components in low and high frequency ranges, a source of a chrominance signal having color difference modulations which when combined with the low frequency portion of the luminance signal provide component color signals R, B and G in the low frequency range, means to demodulate said chrominance signal to provide $G-Y$, $R-G$ and $B-G$ color difference signals, means to add said luminance signal and said $G-Y$ signal to provide a combined high frequency luminance and low frequency G component color signal, a color kinescope having R, B and G guns, means to apply said combined signal to all of said guns, means to apply said $R-G$ signal to said R gun, and means to apply said $B-G$ signal to said B gun.

References Cited in the file of this patent

UNITED STATES PATENTS 2,734,940 Loughlin ............ Feb. 14, 1956
2,745,900 Parker ............ May 15, 1956